UNITED STATES PATENT OFFICE.

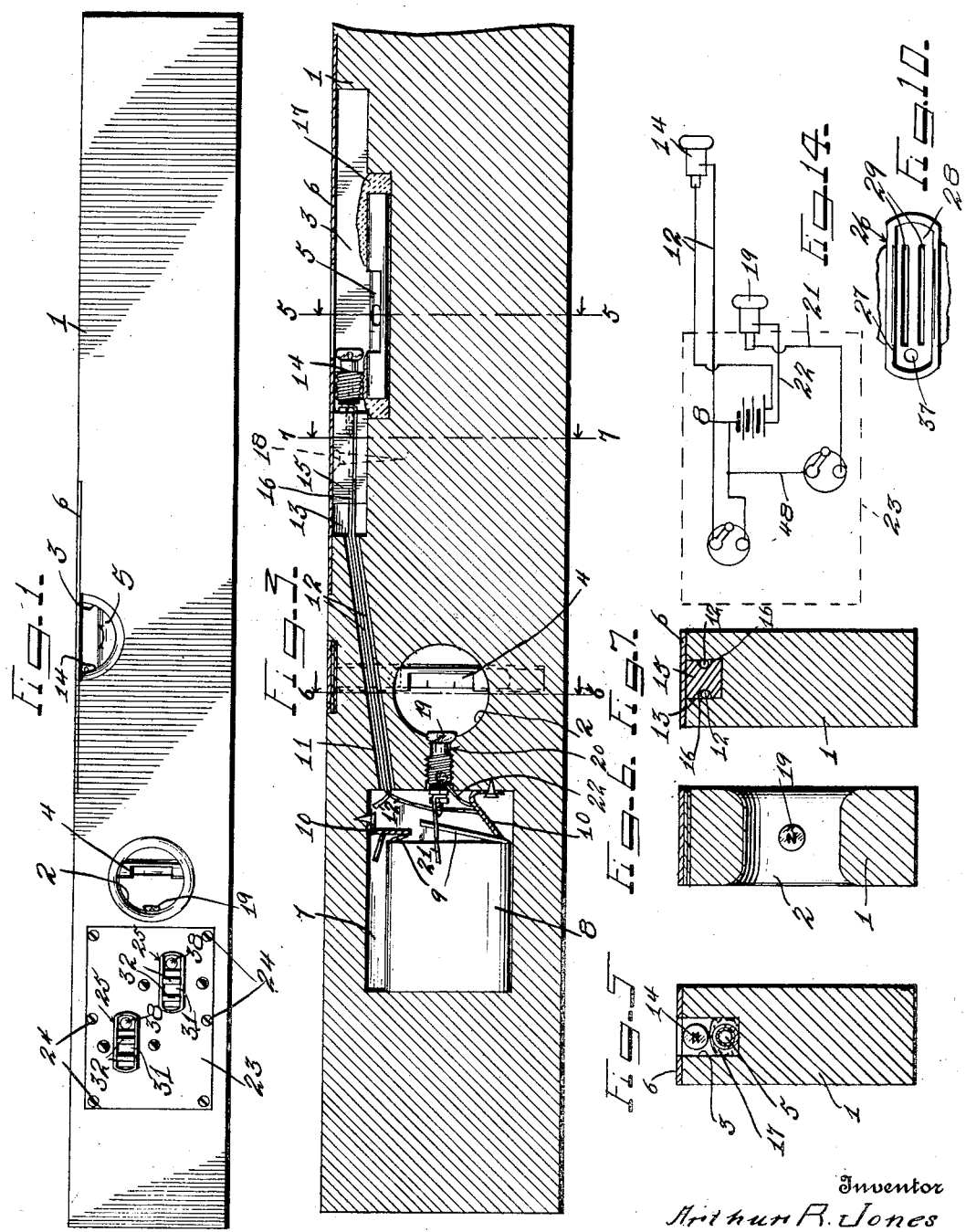

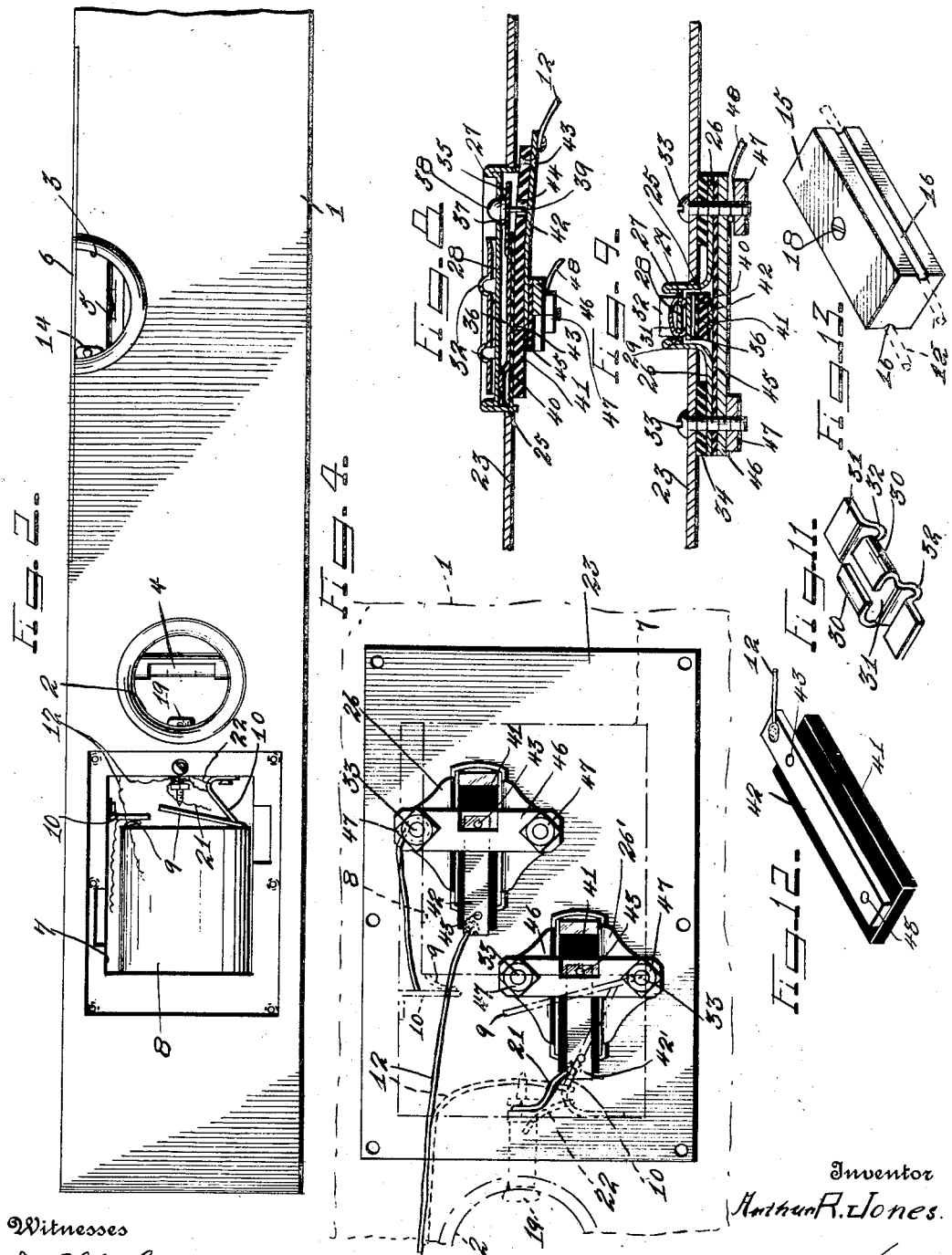

ARTHUR RUSSELL JONES, OF BANGOR, MAINE.

CIRCUIT-CLOSER FOR ELECTRIC-LIGHTED LEVELS OR PLUMBS.

1,139,295.         Specification of Letters Patent.       Patented May 11, 1915.

Application filed August 16, 1913. Serial No. 785,122.

*To all whom it may concern:*

Be it known that I, ARTHUR RUSSELL JONES, a citizen of the United States, residing at Bangor, in the county of Penobscot and State of Maine, have invented certain new and useful Improvements in Circuit-Closers for Electric-Lighted Levels or Plumbs, of which the following is a specification, reference being had therein to the accompanying drawing.

This invention relates to a level and has for its object the production of a simple and efficient means whereby light may be thrown upon the spirit levels for allowing the same to be seen.

Another object of the invention is the production of a simple and efficient contact member which may slide upon the support for closing the circuit and lighting the lamp and which may be easily moved for breaking the contact when it is not desired to use the light.

With these and other objects in view this invention consists of certain novel combinations, constructions and arrangements of parts as will be fully described and claimed.

In the accompanying drawings: Figure 1 is a side elevation of the level. Fig. 2 is a side elevation of a portion of the level the cover plate being removed. Fig. 3 is a central longitudinal section of the level. Fig. 4 is a rear elevation of the cover plate showing the contact members carried thereby. Fig. 5 is a section taken on the line 5—5 of Fig. 3 looking in direction of the arrow. Fig. 6 is a section taken on the line 6—6 of Fig. 3 looking in direction of the arrow. Fig. 7 is a section taken on the line 7—7 of Fig. 3 looking in direction of the arrow. Fig. 8 is a longitudinal section taken through the cover plate and one of the contact members. Fig. 9 is a transverse section taken through the plate and one of the contact members. Fig. 10 is a top plan view of the housing used in connection with the contact member. Fig. 11 is a perspective view of the bottom portion of the sliding circuit closure. Fig. 12 is a perspective view of the insulating block and the contact plate carried thereby. Fig. 13 is a perspective view of a filler block used in combination with the device. Fig. 14 is a diagrammatic view of the wires forming the circuit.

Referring to the accompanying drawings by numerals; 1 indicates the level having a circular opening 2 and a pocket 3. The circular opening 2 is provided with a transverse spirit level 4 while the pocket 3 is provided with a longitudinally extending spirit level 5, this spirit level 5 being protected by means of the protector plate 6.

From the foregoing description it will be seen that a simple level has been produced which is adapted to be applied to vertical and horizontal surfaces for determining whether or not the same are exactly vertical or horizontal.

The body of the level 1 is provided with a squared pocket 7 which is adapted to receive the battery 8. This battery 8 is provided with the contact members 9 which are adapted to be engaged by the stationary contact members 10 carried by the level 1. This level 1 is provided with a slanting channel 11 which is adapted to receive the wires 12. These wires extend so as to pass through the socket 13 so as to engage the incandescent light 14. In order to hold the wires 12 in position within the socket 13 there is provided a filler block 15 having longitudinal grooves 16 in which the wires are adapted to fit. In order to hold the light 14 so as to reflect light upon the spirit level 5, the spirit level and lamp 14 are held in position by means of the cement or plaster of Paris 17. It will also be seen that the block 15 will be held in position by means of a screw 18. An incandescent light 19 is held within an opening 20 formed in the level body 1 so as to reflect light upon the spirit level 4. This light is provided with the wires 21 and 22.

In order to close the circuit when desired, the level is provided with a pair of circuit closing members which are carried by the cover plate 23, this cover plate being positioned over the squared pocket 7 and being held in position by means of the screws 24. This cover plate 23 is provided with a pair of rectangular openings 25 and in each one of these openings 25 there is positioned a housing 26. This housing 26 is provided with the vertical sides 27 and with the connecting bridge 28. This bridge 28 is provided with a pair of longitudinal slots 29 which are adapted to receive the bent lips 30 of the sliding circuit closure 31. This sliding circuit closure is provided with the ribs 32 for facilitating the movement of the same upon the bridge 28. The cover plate 23 is provided with the supporting bolts 33 which are provided with the insulating blocks 34. The housing 26 is positioned upon these supporting bolts 33 so as to rest upon the insulating blocks 34. A spring contact arm 35 is soldered to the housing 26. This spring contact arm is provided with a crimped portion 35 which is positioned out of alinement with the ends of the spring contact arm. In this manner it will be seen that the bent lips 30 will be allowed to slide within the slots 29 without interference from the spring contact arm 35. An aperture 37 is formed within the housing 26 in which fits the head 38 of the contact pin 39. This contact pin 39 and head 38 are carried by the spring contact arm, whereby the head 38 will spring outwardly through the aperture 37. A mica strip 40 is positioned upon the lower side of the spring contact arm 35 and an elongated insulating strip 41 which may be formed of rubber is positioned upon the lower side of the mica strip 40. An elongated contact plate 42 is carried by the insulating strip 41 by means of the rivets 43. It will be seen that by use of the mica strip 40 that the rivets 43 will not come into contact with the arm 35. The insulating strip 41 is provided with an opening 44 in which the end of the contact pin 39 normally extends. When the circuit closure 31 is moved along the bridge 28, the head 38 will be moved inwardly whereby the contact pin 39 will come into engagement with the contact plate 42. In order to hold the mica strip 40, insulating strip 31 and contact strip 42 in position, there is provided a strip of mica 45, which extends transversely across the housing 26 and rests upon the securing bolts 33. The bar 46 is then positioned upon the securing post 33. These portions are all held in position by means of the nuts 47 being threaded upon the bolts 33 whereby the clamping action of the bar 46 upon the transverse mica strip 45 will bind the mica strip 40, insulating strip 41 and contact strip 42 in firm engagement with the spring contact arm 35 and the housing 26.

The inner ends of the wires 12 which are attached to the incandescent lamp 14 extend into the squared pocket 7 so as to allow one of the wires to be attached to the spring contact plate 42 while the other wire 12 is attached to one of the stationary contact members 10. The wire 22 which is attached to the incandescent light 19 is attached to the contact member 10 carried by the level 1 while the wire 21 is connected to the contact plate 42'. A branch wire 48 is attached to one of the stationary contact members 10 and at the opposite end to one of the binding posts 33.

When the pin 39 comes in contact with the contact plate 42, it closes the circuit. The current will pass through one of the contact members 9 carried by the battery through the contact member 10 carried by the level and then through the branch wire 48 into the binding posts 33. The current will then pass through the housing and sliding circuit closure into the pin 39. When this pin 39 is in contact with the plate 42, the current will pass through this plate into the wire 12 which is carried thereby. The current will continue to pass through the incandescent light and back through the other wire 12 into the other stationary contact carried by the level 1 and into the battery by means of the other contact member carried by the battery. The light will continue to burn as long as the pin 39 remains in engagement with the plate 42.

If it is desired to light the lamp 19 the other sliding circuit closure 31 is moved so as to allow the pin to come into engagement with the contact plate 42'. The current will then pass through one of the contact members 9 and 10 and through the branch wire and the binding post 33. As this binding post 33 is ground upon the cover plate 23 the current will pass through this cover plate and into the housing 26'. The current will then pass through the contact pin and into the contact plate 42'. As this plate 42' is connected to the wire 21 the current will continue in the wire 21 and into the light 19. The current will then continue in the wire 22 into the other contact 10 and then into the battery by means of the contact carried thereby. It will also be seen that both lights will burn at the same time by allowing the pins 39 to engage the contact plates 42 and 42' since the branch wire 48 which is electrically connected to one portion of the battery is grounded upon the cover plate 22.

From the foregoing description it will be seen that a simple and efficient level has been produced which is provided with electric means for illuminating the spirit levels carried thereby, said electrical means being provided with efficient members for closing or breaking the circuit as desired.

Having thus described the invention, what is claimed as new, is:—

1. In a circuit closer for an electric lighted level and plumb the combination of a body, means for forming a circuit carried by said body, a cover plate carried by said body, a housing carried by said cover plate, said housing comprising a plurality of vertical sides, an integral bridge carried by said sides and positioned at a spaced distance below the top of said sides, a circuit closer slidably mounted upon said bridge and fitting between said sides, said sides constituting a shield for guarding said circuit closer, a spring fixedly secured to the under side of said bridge, said spring provided with an off-set portion so as to allow the spring to swing easily without interference from said bridge, a pin having a head carried by the free portion of said spring, said circuit closer adapted to engage said head for driving said pin inwardly for closing the circuit.

2. In an electric lighted level and plumb, the combination of a body, means for forming a circuit carried by said body, said body provided with a cover plate having an elongated slot, a housing carried by said plate and extending through said slot, said housing comprising side walls, an integral bridge carried by said walls, a circuit closer slidably mounted upon said bridge and fitting between said sides, said sides constituting a shield for guarding said circuit closer, said housing provided with integrally bent portions positioned upon the inner side of said plate, thereby holding said housing in its correct position.

In testimony whereof I hereunto affix my signature in presence of two witnesses.

ARTHUR RUSSELL JONES.

Witnesses:
 LENA GOLDEN,
 LUTHER G. NASON.